Patented Mar. 13, 1934

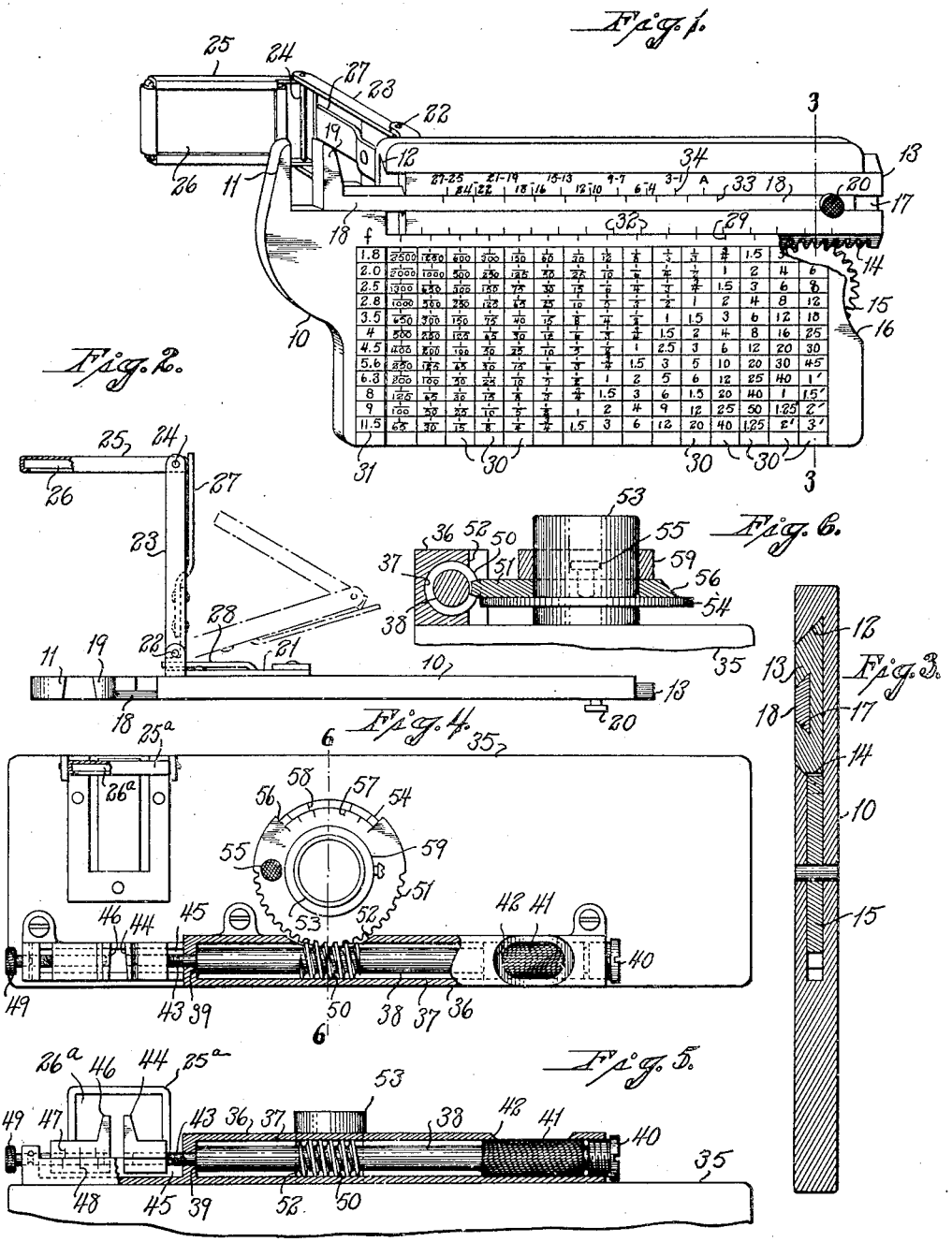

1,951,180

UNITED STATES PATENT OFFICE 1,951,180

DEVICE FOR DETERMINING LIGHT INTENSITY

Charles Ansel Watrous, New Haven, Conn.

Application January 21, 1933, Serial No. 652,815

6 Claims. (Cl. 88—23)

This invention relates to an improvement in devices for determining light intensity and is intended primarily for use in connection with photographic cameras though not so limited.

Heretofore, many devices and methods have been provided for the purpose of guiding a camera operator in the operation of a camera under various conditions of light, etc., but with more or less indifferent results.

The present invention takes advantage, as will be hereinafter more fully explained, of the fact that the iris of the human eye contracts and expands, thus varying the area of the pupil, in response to changes in intensity of light.

An object of the present invention is to provide a superior, convenient and accurate means for determining light intensity, whereby, for instance, a camera operator may be assured of more consistently good results.

Another object of my invention is to provide a superior device whereby, in addition to light intensity, other variables, such for instance as the sensitivity of the emulsion on the films or plates being used, may be readily taken into account in operating a camera.

A further object is to provide a device by which both the factors of light intensity and film or plate sensitivity may be coordinated in determining the optimum exposure.

A still further object is to provide the camera with adjustable light-intensity measuring means acting to automatically operate the diaphragm or other light-controlling device thereof.

Other objects and advantages will appear to those skilled in the art from the following, taken in conjunction with the accompanying drawing and the appended claims.

In the accompanying drawing:

Fig. 1 is a perspective view of one form which a device embodying my invention may assume;

Fig. 2 is a top or plan view thereof partly in section;

Fig. 3 is a transverse sectional view taken on the line 3—3 of Fig. 1 but on a larger scale;

Fig. 4 is a view in front elevation of a camera equipped with a measuring and compensating device constructed in accordance with my invention and shown as directly coupled to the diaphragm-operating member of such a camera;

Fig. 5 is a view thereof partly in side elevation and partly in longitudinal section; and Fig. 6 is a transverse sectional view taken on the line 6—6 of Fig. 4 but on a larger scale.

The device herein chosen for the illustration of my invention in Figs. 1 to 3 inclusive includes a plate-like body-member 10 provided with an upstanding caliper-jaw 11 and having a longitudinal undercut groove 12 formed in its front face and extending at substantially a right angle to the said jaw 11. Mounted in the undercut groove 12 just referred to, with capacity for reciprocation therein and having its front face flush with the adjacent portion of the front face of the body-member 10, is a slide or gauge-member 13 which, for convenience of description, will be herein referred to as the "main" slide or gauge-member. The respective upper and lower edges of the said slide are beveled to correspond to the cross-sectional form of the said undercut groove 12, and its lower edge is formed with a longitudinal series of rack-teeth 14 meshing into an operating gear-wheel 15 having a portion of its periphery projecting outwardly beyond the concave portion 16 of the adjacent edge of the body-member 10, so as to be available for engagement by a finger of the user for reciprocating the slide 13 and the parts carried thereby, as will hereinafter appear.

The main slide 13 is in turn formed with a longitudinal undercut groove 17 in which is slidably mounted a relatively-narrow slide or gauge-member 18 having its front face flush with the front face of the main slide 13 and conformed in cross-sectional form to the groove 17 therein. An upwardly-offsetting caliper-jaw 19 projects from the slide 18 and complements the fixed jaw 11 to provide between the said jaws a convenient and adjustable aperture or sight-opening through which the pupil, i. e., the aperture in the iris, of the eye of the user may be observed and by which, in a sense, the pupil may be measured. Preferably and as shown, the opposed faces of the caliper-jaws 11 and 19 are sloped slightly away from each other from rear to front. For the purpose of releasably locking the compensating slide 18 to the main slide 13, I employ a set-screw 20 having a knurled or roughened forward face, so that the said screw may be readily turned by the engagement of the user's finger therewith.

The slide 18 previously referred to will for convenience of description be referred to herein as a "compensating" slide or gauge-member for the reason that it is manipulatable, as will hereinafter appear, with reference to the main slide 13 to compensate for variations in the light-sensitivity of the emulsion on the particular photographic film or plate being used at a given time and also on occasion, to compensate for variations from normal of the pupil of the eye of a user.

Secured to the rear face of the body-member 10 is a plate 21 to which is pivotally secured, by a pin 22, the inner end of a mirror-carrying bracket-arm 23 having pivoted to its outer end, by a pin 24, a mirror-frame 25 carrying a mirror 26 preferably of concave and, therefore, magnifying form. The end of the mirror-frame 25 before referred to adjacent the pin 24 is engaged by a leaf-spring 27 carried by the bracket-arm 23 and serves to yieldingly hold the said mirror-frame and hence the mirror 26 in a plane parallel with the body-member 10 and slides 13 and 18. Similarly, the end of the bracket-arm 23 adjacent the pin 22 is engaged by a leaf-spring 28 serving to yieldingly hold the said bracket-arm in a position substantially at a right angle to the plane of the frame 10.

When the device is not in use, the mirror-frame 25 may be folded down against the bracket-arm 23 and will be yieldingly held in such position by the spring 27. The bracket-arm 23 itself may also be swung from left to right, as viewed in Figs. 1 and 2, into parallelism with and against the rear face of the body-member 10, in which position it will be yieldingly held by the spring 28 aforesaid.

Adjacent the lower edge of the groove 12 the body-member 10 is formed with a series of longitudinally-spaced graduations 29, centered below each of which is inscribed upon the front face of the said body-member a vertical column of reference characters, each of which latter, in the instance shown, represents a degree of shutter-speed. Each of the said columns of reference characters is designated by the numeral 30 for identification in the accompanying drawings. At the extreme left of the columns 30 just referred to is a vertical column 31 of reference characters representing as shown various degrees of diaphragm openings. The front face of the edge of the main slide 13 adjacent the graduations 29 thereon is formed with a longitudinally-spaced series of graduations 32 adapted to be read in conjunction with the graduations 29 but preferably spaced more closely together than the latter, as shown, for the purpose of securing a vernier effect.

The front face of the compensating slide 18 adjacent its upper edge is formed with a longitudinally-spaced series of graduations 33 adapted to be read in conjunction with a parallel series of spaced graduations 34 upon the immediately-adjacent portion of the front face of the main slide 13. The said graduations 34 are preferably and as shown spaced more closely together than the complementary graduations 33 so as to secure at this point a vernier effect also. Each of the graduations 34 is preferably marked, as shown, to indicate various degrees of light sensitivity of various photographic emulsion, in accordance with some predetermined rating, such for instance as the generally-recognized Scheiner scale.

The device above described and illustrated in Figs 1 to 3 inclusive is primarily designed for the guidance of the users of ordinary photographic "still" cameras in determining the most desirable exposure under any given conditions of light, though the device may be conveniently adapted for use in connection with motion picture cameras by suitably rearranging the data thereon.

It may be explained in this connection that so-called "exposure" resolves itself into two main factors in ordinary cameras, namely, the time during which the shutter is open and the size of the aperture. Both the shutter-speed and the aperture size are adjustable in most cameras, and each bears a definite relationship to the other under given light conditions, and together determine, by fixing the area of aperture and the time light is permitted to pass through that aperture, the quantity of light reaching the sensitive film or plate Thus, I preferably provide as shown a vertical column 30 of reference characters representing various shutter-speeds, in connection with each of the calibrations 29 on the body-member and also provide adjacent the extreme left-hand one of said columns a vertical column 31 of reference characters representing various diaphragm settings.

It may be further explained that the various photographic emulsions in general use differ in their sensitivity to light, so that in deciding upon the proper exposure it is necessary, to insure good results, that the particular character of the emulsion upon the plates or films being used, be taken into account, and for this purpose, as before stated, the graduations 34 are each designated as representing emulsions of various sensitivity in accordance with the so-called "Scheiner" sensitivity rating, though other ratings may be used.

In the use of the device above described, the set-screw 20 is loosened and the compensating slide 18 is longitudinally adjusted with reference to the main slide 13 until the appropriate one of the graduations 34 has registered with it the complementary one of the graduations 33 on the said compensating slide. The device may be thus set to properly compensate for the sensitivity of the particular emulsion being used and also, if necessary, for abnormalities in the eye of the user. The slide 18 may then be locked in place by means of the set-screw 20.

The mirror 26 is now swung into the position in which it is shown in Figs. 1 and 2, if not already in such position, and the caliper-jaws 11 and 19 are brought into a position close to the eye of the user, at which time the image of the pupil of the eye may be readily observed in the mirror 26 as appearing between the said complementary jaws 11 and 19. The device may now be oriented so that the eye of the user is pointed in the direction of the subject to be photographed and by virtue of this fact, the iris of the eye will become automatically adjusted in accordance with the particular light intensity being reflected by such subject.

The main slide 13, together with the slide 18 carried thereby, may now be manipulated longitudinally by means of the operating-wheel 15 until the opposed edges of the respective jaws 11 and 19 appear reflected in the mirror in a position just bordering upon the respective opposite sides of the pupil of the eye of the observer. Thus, the spacing of the jaws 11 and 19 as just described will be determined by the size of the pupil which, as before described, varies with the intensity of the light to which it is subjected.

The device may now be removed from the eye and then on the front face of the device, the appropriate one of the several vertical columns 30 of reference characters will be indicated by the particular one of the graduations 29 with which is registered its complementary graduation 32 on the main slide 13. As the device is adjusted in Fig. 1, the compensating slide 13 has been adjusted into appropriate position for emulsions having a Scheiner sensitivity rating of 21°–19° and the main slide is in position to indicate the fifth column, 30, from the right as being the particular column to be referred to.

Now by referring to the column 31 designating various diaphragm-openings and selecting the desired diaphragm-opening such, for instance, as that marked 3.5 and following over from left to right in parallelism therewith until the column above which the graduations 29 and 32 are in registration is reached, the proper shutter-speed will be indicated as, for instance, 1.5 seconds in the instance now being referred to. The process may be reversed, if desired, by first selecting a desired shutter-speed and reading from right to left and ascertaining the proper diaphragm-opening in the column 31.

The above sets forth the use of the device as used in connection with the novel means of ascertaining light intensity, but it may be here stated that, if desired, the slides 13 and 18 may be appropriately set by ascertaining the light intensity by any other approved method than that herein described, and the interrelated data on the front face of the instrument may be utilized in the same manner as that above described.

In Figs. 4 to 6 inclusive, I have illustrated a device constructed in accordance with my invention as being directly applied to a camera for directly operating the aperture-control mechanism thereof. The particular camera chosen for illustration happens to be an amateur motion picture camera.

In the construction shown in the figures now being described, a folding mirror-frame 25ᵃ is pivotally mounted upon the front face of the camera box 35, and carries a mirror 26ᵃ. Arranged adjacent and paralleling the opposite edge of the camera box 35 is a mounting-frame 36 having formed therein a tubular chamber 37 housing a rotary operating-spindle 38. The said spindle is mounted in the chamber 37 with capacity for rotary movement and is held against appreciable axial movement by being provided adjacent one end with a shoulder 39 abutting against the end wall of the chamber 37, and having its opposite end abutted against a screw-plug 40.

At its end adjacent the screw-plug 40, the operating-spindle 38 is formed with a knurled portion 41 by means of which it may be turned as will hereinafter appear, and which is exposed for operation through a clearance cut 42 formed in the outer face of the mounting-frame 36. At its end opposite the knurled portion 41, the spindle 38 is provided with a shank 43 rotatably bearing in the end wall of the chamber 37 and extending therebeyond into threaded engagement with a caliper-jaw 44 slidably mounted in a guide-way 45 in the frame 36 and projecting therefrom as clearly shown in Fig. 5.

Also slidably mounted in the guide-way 45 and located adjacent the caliper-jaw 44 for cooperation therewith is a complementary caliper-jaw 46 provided with a series of graduations 47, cooperating on occasion with a series of graduations 48 formed upon the adjacent surface of the frame 36. The respective graduations 47 and 48 are proportioned with respect to each other so as to cooperate with a vernier effect, and the said jaw 46 is adjustable longitudinally by means of an adjusting-screw 49 mounted in the frame 36 as clearly shown in Fig. 5.

Intermediate its respective opposite ends, the operating-spindle 38 is provided with worm-teeth 50 meshing into and driving a worm-wheel 51 which projects into engagement with the said worm through a clearance-opening 52 formed in the frame 36. The said worm-wheel 51 is mounted with freedom for rotary movement upon a lens barrel or tube 53 forming a usual feature of most cameras and requiring no detailed description herein other than to say that in the particular camera herein chosen for illustration, the lens barrel 53 is rotatable and serves to adjust the diaphragm-opening of the camera and carries, rigidly mounted upon it, a disk 54 which is operatively connected with capacity for relative rotary adjustment with the worm-wheel 51 by a set-screw 55.

The side of the worm-wheel 51 opposite its point of normal engagement with the worm 50 is peripherally notched as at 56 and carries an arcuate series of spaced graduations 57 readable in connection with a similarly-arranged series of graduations 58 on the adjacent upper surface of the disk 54, as clearly shown in Fig. 4, the said graduations 57 and 58 being related to each other in spacing so as to coact with a vernier effect. To guard against the axial displacement of the worm-wheel 52 with respect to the lens barrel 53, I mount on the latter a retaining-collar 59, as clearly shown in Fig. 6.

Let it be presumed that the graduations 47 and 48 cooperate to indicate various degrees of emulsion sensitivity and that the graduations 57 and 58 represent various shutter-speeds, which in a motion picture camera are usually referred to as "frames per second."

Now in the use of the device of Figs. 4 to 6 inclusive, the caliper-jaw 46 may first be set so that one of its graduations 47 registers with its complementary graduations 48 upon the frame 36 to indicate the correct sensitivity rating on the particular film being used in the camera. The camera is now so held that the caliper-jaws are close to the eye of the user, so that a reflection of the pupil of the eye may be readily observed in the mirror 26ᵃ as appearing between the complementary jaws 44 and 46.

The entire camera is oriented so that the eye of the user is pointed in the direction of the object to be photographed and by virtue of this fact, the pupil of the eye will become adjusted in accordance with the intensity of the light reflected by the subject to be photographed. Now by manipulating the operating-spindle 38 until the complementary jaws 44 and 46 substantially coincide with the respective opposite sides of the pupil of the eye of the user, the said spindle will have acted automatically, through the intermediary of the worm 50 and worm-wheel 51, to adjust the diaphragm-opening (not shown) of the camera, to the proper degree under any given light condition. The disk 54 may now be adjusted with respect to the worm-wheel 51 by loosening the set-screw 55 and rotating the said disk with the fingers to cause the same to come into correct relationship commensurate with the shutter-speed to be used. If desired, however, the relative adjustment of the disk 54 and worm-wheel 51 may be made prior to making the observations in the mirror before described.

From the foregoing, it will appear that by means of my invention, I have provided an accurate and effective method and means for guiding camera users in the use thereof.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. In a device for determining light intensity and correlating the same with respect to the sensitivity of various photo-sensitive materials: the combination with a body-member carrying means providing an adjustable sight-opening; of a mirror carried by the said body-member and designed and adapted to concurrently reflect an image of the pupil of an observer's eye and complementary walls of the said adjustable sight-opening; and two complementary gauge-members each independently movable with respect to the other and each constructed and arranged to modify the size of the aforesaid sight-opening.

2. In a device for determining light intensity and correlating the same with respect to the sensitivity of various photo-sensitive materials: the combination with a body-member carrying means providing an adjustable sight-opening; of a mirror carried by the said body-member and designed and adapted to concurrently reflect an image of the pupil of an observer's eye and complementary walls of the said adjustable sight-opening; and two complementary gauge-members each independently movable with respect to the other and each constructed and arranged to modify the size of the aforesaid sight-opening; each of the said gauge-members being provided with a series of graduations readable in connection with a differentially-spaced series of graduations on another portion of the device; the complementary graduations for one of the said gauge-members being related to the complementary graduations for the other of said gauge-members in such manner that one gauge-member may be moved with respect to the other gauge-member to effect a change in size of the aforesaid sight-opening to allow for variations in the sensitivity of various photo-sensitive materials and the graduations of the other gauge-member being so related as to indicate variations in the size of the pupil of an observer's eye.

3. In a device for determining light intensity and correlating the same with respect to the sensitivity of various photo-sensitive materials: the combination with a body-member carrying means providing an adjustable sight-opening; of a mirror carried by the said body-member and designed and adapted to concurrently reflect an image of the pupil of an observer's eye and complementary walls of the said adjustable sight-opening; a main gauge-member carried by and movable with respect to the said body-member and constructed and arranged to modify the size of the aforesaid sight-opening; and a complementary secondary gauge-member carried by the said main gauge-member and independently movable with respect thereto and also constructed and arranged to modify the size of the aforesaid sight-opening.

4. In a device for determining light intensity and correlating the same with respect to the sensitivity of various photo-sensitive materials: the combination with a body-member carrying means providing an adjustable sight-opening; of a mirror carried by the said body-member and designed and adapted to concurrently reflect an image of the pupil of an observer's eye and complementary walls of the said adjustable sight-opening; a main gauge-member carried by and movable with respect to the said body-member and constructed and arranged to modify the size of the aforesaid sight-opening; and a complementary secondary gauge-member carried by the said main gauge-member and independently movable with respect thereto and also constructed and arranged to modify the size of the aforesaid sight-opening; each of the said gauge-members being provided with a series of graduations readable in connection with a differentially-spaced series of graduations on another portion of the device; the complementary graduations for one of the said gauge-members being related to the complementary graduations for the other of said gauge-members in such manner that one gauge-member may be moved with respect to the other gauge-member to effect a change in size of the aforesaid sight-opening to allow for variations in the sensitivity of various photo-sensitive materials and the graduations of the other gauge-member being so related as to indicate variations in the size of the pupil of an observer's eye.

5. In a device for determining light intensity and correlating the same with respect to the sensitivity of various photo-sensitive materials: the combination with a camera having exposure-regulating means; of a body-member carrying means providing an adjustable sight-opening; of a mirror carried by the said body-member and designed and adapted to concurrently reflect an image of the pupil of an observer's eye and complementary walls of the said adjustable sight-opening; two complementary gauge-members each independently movable with respect to the other and each constructed and arranged to modify the size of the aforesaid sight-opening; and means operatively connecting one of the said independently-movable gauge-members to the said exposure-regulating means of the said camera.

6. In a device for determining light intensity and correlating the same with respect to the sensitivity of various photo-sensitive materials: the combination with a body-member carrying two complementary jaw-members, one at least of which is movable toward and away from the other; of a mirror carried by the said body-member and designed and adapted to concurrently reflect an image of both the pupil of the observer's eye and the said jaw-members; and two complementary gauge-members each independently movable with respect to each other and both of which are connected to one of the said jaw-members for effecting the movement thereof; each of the said gauge-members being provided with a series of graduations readable in connection with a differentially-spaced series of graduations on another portion of the device; the complementary graduations for one of the said gauge-members being related to the complementary graduations for the other of said gauge-members in such manner that one gauge-member may be moved with respect to the other gauge-member to allow for variations in the sensitivity of various photo-sensitive materials and the complementary graduations of the other gauge-member being so related as to indicate variations in the size of the pupil of an observer's eye.

CHARLES ANSEL WATROUS.